MAGNETIC TAPE PRESSURE ROLLER ASSEMBLY

Filed Aug. 21, 1962 2 Sheets-Sheet 1

Eric H. Lundgren
Willard A. Wayne
INVENTORS

BY Clarence A. O'Brien
and Harvey B. Jacobson
Attorneys

Nov. 16, 1965 E. H. LUNDGREN ETAL 3,217,997

MAGNETIC TAPE PRESSURE ROLLER ASSEMBLY

Filed Aug. 21, 1962 2 Sheets-Sheet 2

Eric H. Lundgren
Willard A. Wayne
INVENTORS

BY Clarence A. O'Brien
and Harvey B. Jacobson
Attorneys 3,217,997

MAGNETIC TAPE PRESSURE ROLLER ASSEMBLY

Eric H. Lundgren, 3492 38th Ave., and Willard A. Wayne, 662 Arimo Ave., both of Oakland, Calif.

Filed Aug. 21, 1962, Ser. No. 218,243
4 Claims. (Cl. 242—55.19)

The present invention generally relates to novel improvements in pressure roller mechanisms for use in conjunction with a magnetic tape pickup or reproducing head and more particularly to such a mechanism that is cam released for applying pressure on the tape and pressing it against a rotating capstan thus enabling the tape to be pulled across the pickup or recording and reproducing head.

Prior art devices such as disclosed in Patent Nos. 2,876,005 and 3,009,024 issued to George H. Eash, disclose devices in which the tape is placed in a cartridge and the entire cartridge inserted into the recording and reproducing mechanism with a separately operable lever or similar means being provided for moving a pressure roller in relation to a driving capstan for retaining the tape in engagement with the capstan. In the present invention, there is provided a spring-biased pressure roller assembly in the cartridge which is released by a rotary cam assembly for pressing the tape against the rotating capstan thereby pulling the tape across the magnetic recording and playback or reproducing head thereby enabling automatic operation of the pressure roller so that a multiple of cartridges may be disposed in vertically spaced orientation and further enabling the cartridges to be sequentially played or recorded by virtue of the automatically operated pressure roller assembly.

An object of the present invention is to provide a pressure roller assembly for magnetic tape cartridge devices which provide for automatic control and operation of the cartridges and further enabling the cartridges to be transported, stored or the like while in position for playing or recording.

A further object of the present invention is to provide a spring pressure roller assembly for positioning directly in the magnetic tape cartridges which enables the cartridge to be used without any external fastener or pressure means.

Yet another object of the present invention is to provide a pressure roller assembly for magnetic tape cartridges which includes a self-contained spring-biased roller controlled by an external cam structure which eliminates the necessity of the cartridge being moved in order for the pressure roller to make contact with the capstan, the cartridge being positioned and held in place by two guides and a stop.

Still another feature of the present invention is to provide a pressure roller assembly which is relatively simple in construction, easy to install and control and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
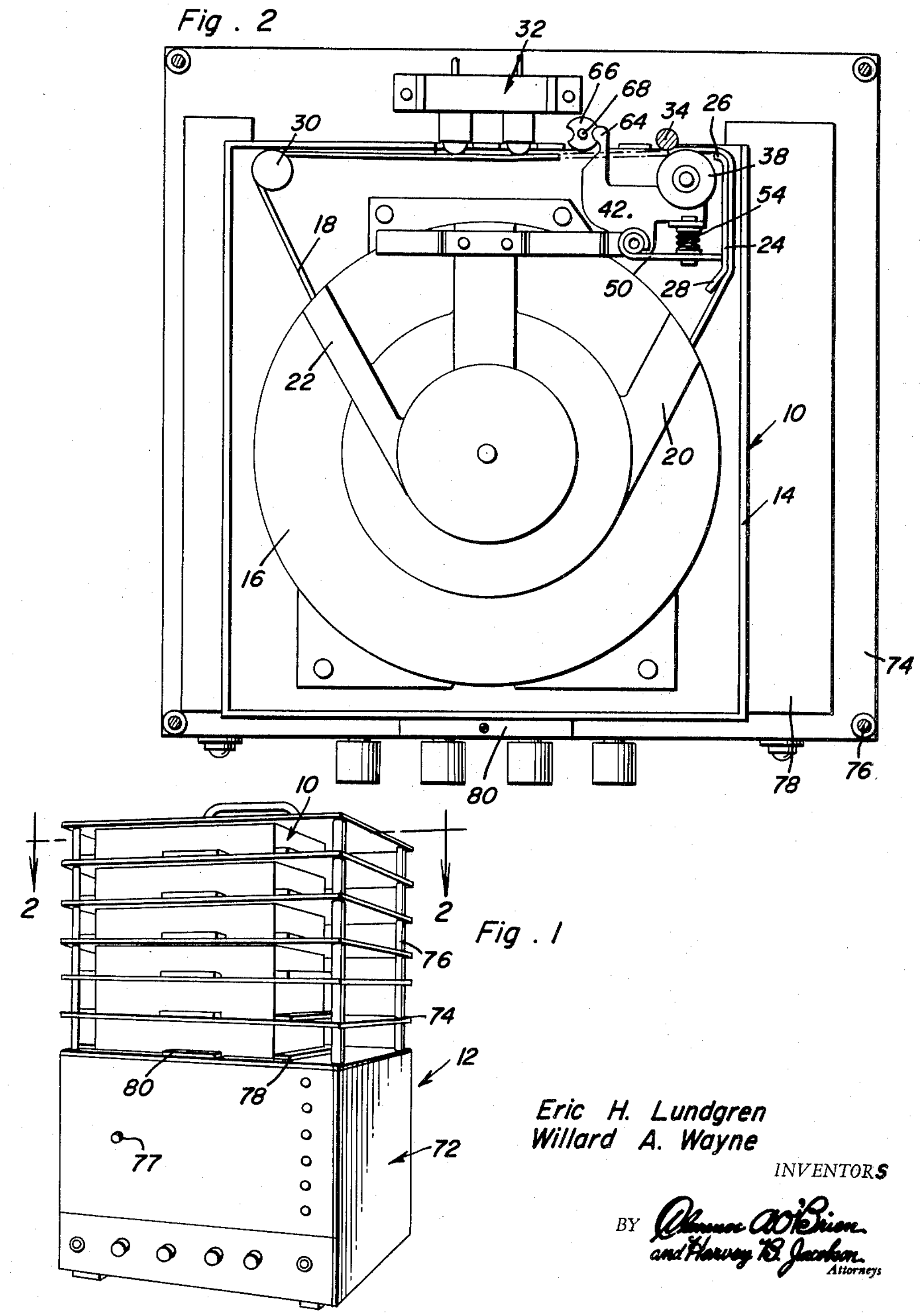
FIGURE 1 is a perspective view of the stack of magnetic tape cartridges orientated in operative position on the supporting structure therefor.
FIGURE 2 is a plan view taken substantially upon a plane passing along section line 2—2 of FIGURE 1 illustrating the orientation of the components of the invention to the magnetic recording and reproducing head and the driving capstan.
Figures 3, 4:
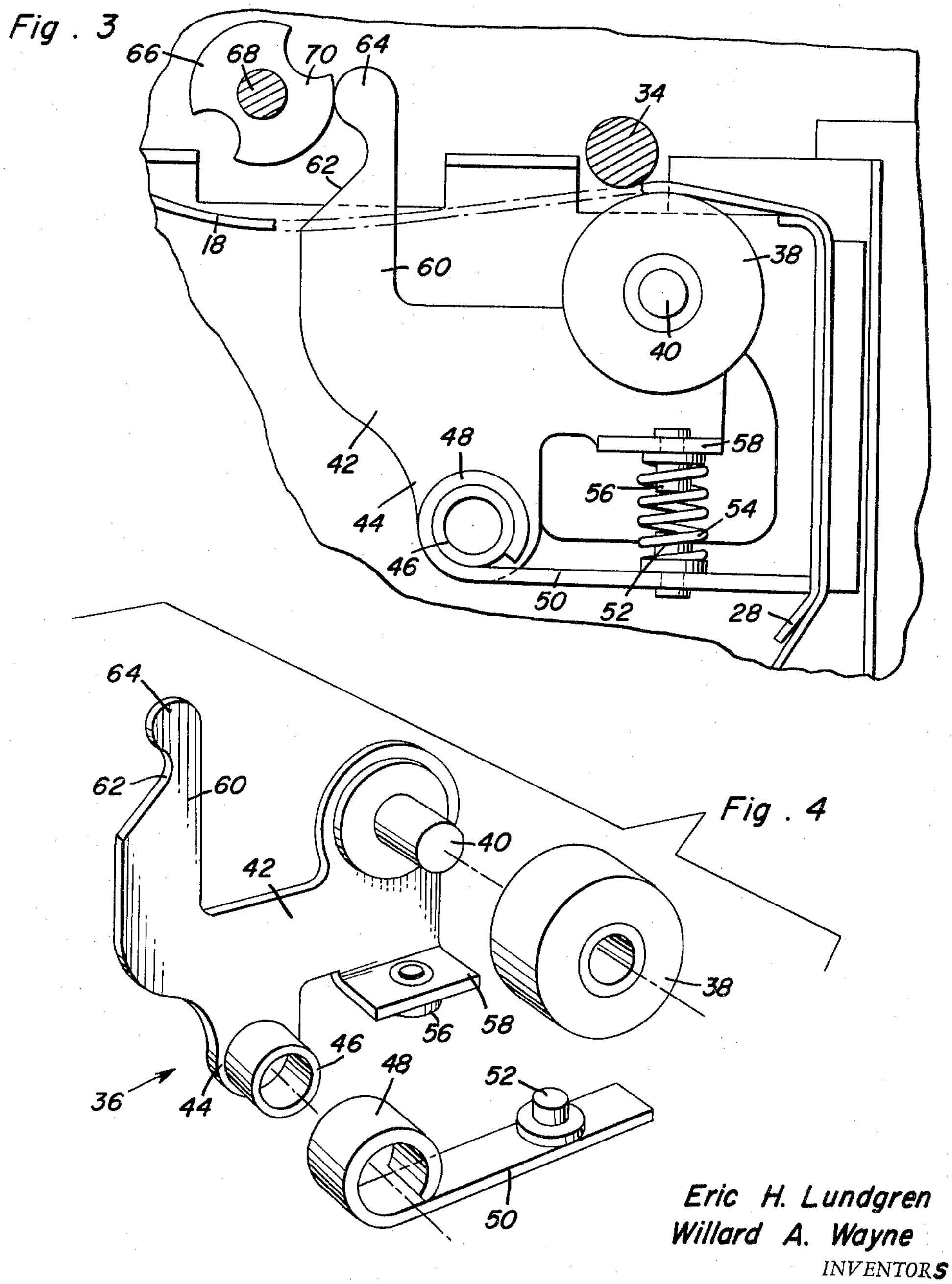
FIGURE 3 is an enlarged plan view of the spring pressure roller assembly illustrating its relationship to the capstan and the control cam.
FIGURE 4 is an exploded group perspective view of the present invention illustrating the relationship of the components thereof.

Referring now specifically to the drawings, the numeral 10 generally designates a magnetic tape cartridge which is illustrated associated with a recording and reproducing mechanism generally designated by the numeral 12. The magnetic tape cartridge 10 includes a generally rectangular housing 14 with a centrally disposed reel assembly 16 on which the magnetic tape 18 is wound and unwound in a conventional manner. The reel assembly includes guides 20 and 22 for guiding the tape during the playback or recording movement and also during the rewind movement thereof. Adjacent one corner of the cartridge 10, there is provided an elongated plate-type guide 24 for the tape which has a curved outer end 26 and an angulated inner end 28 for guiding the tape 18. Adjacent the other corner of the cartridge 10 is a guidepost or roller 30 whereby the tape 18 as it proceeds from the rounded end 26 to the guidepost 30 will pass over or alongside of the magnetic recording and reproducing head assembly generally designated by numeral 32 which is of conventional construction and forms no particular part of the present invention.

For driving the tape 18, there is provided a driving capstan 34 which extends perpendicular to the path of movement of the tape and which engages the tape for pulling the tape across or past the recording and reproducing head assembly 32.

The essential features of the present invention reside in the provision of a spring roller assembly 36 for applying pressure to the tape 18 for pushing it against the drive capstan 34. The assembly 36 includes a spring pressure roller 38 journaled on an upstanding pin or shaft 40 carried by the generally L-shaped plate 42. The inner corner of the plate 42 is provided with an inward projection 44 having a sleeve 46 thereon journaling a sleeve 48 on one end of an arm 50. The arm 50 has a projection 52 on one surface thereof for receiving one end of a coil spring 54. The terminal end of the arm 50 is disposed in the included angle formed by the angulated end portion 28 of the plate-type guide 24. The other end of the spring 54 is received on a guide projection 56 carried by a laterally extending lug 58 on the plate 42 which is in alignment with the shaft 40 and the pressure roller 38 whereby the spring 54 will bias the plate 42 and the roller 38 mounted thereon toward the driving capstan 34 thus causing the tape 18 to be gripped by and driven by the capstan 38 in the usual manner, since plate 42 is pivoted on a spacer stem.

The plate 42 is also provided with a leg 60 remote from the shaft 40 which has a notch 62 in one edge thereof defining a generally circular projection 64 which is in the form of a cam follower for engaging a cam 66 carried by a shaft 68 parallel to the driving capstan 38. The cam 66 is provided with a pair of diametrically opposed semicircular notches 70 therein for receiving the projection 64 on the leg or arm 60 thereby causing oscillation of the plate 42 about an axis defined by the sleeve 46 which also serves to pivotally mount the plate 42 to the bottom plate of the casing 14. Thus, when the cam follower 64 is received in one of the notches 70, the spring 54 expands and forces the roller 38 towards the driving capstan 34 thereby causing the driving capstan 34 to pull the magnetic tape across the recording and reproducing head assembly 32 for either recording or reproducing in a conventional manner.

The supporting and transporting mechanism 12 includes a base cabinet structure 72 housing the various electronic and driving equipment for the driving capstan 34, the camshaft 68 and the electronic equipment for energizing and receiving impulses from the recording and reproducing head in a conventional manner. The controls therefor and the speaker assemblies and microphone assemblies are all of conventional nature and form no particular part of the present invention. In actual practice, there is provided a stack of six cartridges 10, each being supported on a horizontally disposed shelf 74. The shelves are supported on their corners by corner posts 76 which are connected with the cabinet 72 in any suitable manner. Each shelf 74 has a reproducing and recording head assembly 32 mounted thereon in any suitable manner and the driving capstan 34 and the camshaft 68 extend vertically through each shelf alongside of the inner end of each cartridge 10. A suitable motor is provided for rotating the capstan 34 and the camshaft 68 may be actuated either manually or with an electromagnet or solenoid assembly. As illustrated in FIGURES 1 and 2, the six cartridges require six cams and each cam has two notches 70 thereon. Thus, a conventional twelve position rotary solenoid is employed for controlling operation of the camshaft 68. The solenoid and its details are not illustrated since the camshaft 68 may be rotated manually, by a twelve position solenoid or by any other suitable structure. When a twelve position rotary solenoid is used to operate the camshaft 68, the rotary solenoid may be controlled in several ways. For example, a piece of metallic foil may be adhered to the magnetic tape passing over a contact element engaging the tape thus closing the circuit which in turn operates the solenoid that turns the camshaft 68 on which the cams 66 are mounted. Also, the solenoid may be operated electronically by the lack of sound or information on the magnetic tape for a short period of time. Also, the camshaft 68 when powered by a solenoid will have rotary switches thereon that control the recording head so that only one head is connected to the input source of sound reproducing equipment. While the device has been illustrated with six cartridges disposed thereon, it is pointed out that one or more cartridges may be placed in the device and any number of cartridges may be employed by merely increasing the number of shelves and correspondingly increasing the length of the capstan, the camshaft and increasing the number of recording and reproducing heads. Also, a manual selector switch 77 is provided on the cabinet.

Suitable guides 78 and stops 80 with an adjusting screw are provided on each shelf for retaining the cartridge in stationary position. Thus, the present invention includes the endless tape cartridge with the pressure roller assembly incorporated therein and actuated by a rotating cam that is controlled either manually or by solenoid. This provides a tape transport system for handling the cartridges and eliminates all externally operated pressure roller mechanisms such as disclosed in the aforementioned patents. The particular size relationships of the components may vary depending upon the length of the tape and the size of the driving capstan and pressure roller and the pressure roller may be of any suitable material meeting the requirements of the use for which the same is intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A magnetic tape cartridge assembly adapted to be orientated stationarily in a recording and reproducing assembly having a driving capstan and a cam control means, said cartridge assembly including a housing having reel means thereon from which the magnetic tape is reeled, guide means for retaining the tape adjacent an edge of the cartridge so that it can be moved into driving engagement with the driving capstan, a pressure roller disposed within the confines of the housing, a plate pivotally mounted on said housing, said pressure roller being journalled on said plate for movement in relation to the housing and magnetic tape for moving the magnetic tape into driving engagement with the capstan, spring means engaged with said plate and disposed within the housing for biasing said roller toward the tape and the edge of the cartridge, and means on said plate adapted to engage the cam control means on the recording and reproducing assembly and projecting beyond the edge of the cartridge for retracting the roller away from the edge of the cartridge housing at selected intervals for selectively engaging the magnetic tape drivingly with the capstan.

2. A magnetic tape cartridge recording and reproducing assembly including a plurality of vertically spaced shelves, a magnetic tape cartridge on each shelf, each of said shelves including means for retaining the magnetic tape cartridge thereon in stationary position, a vertically disposed driving capstan extending through each of the shelves adjacent the inner end of each cartridge, each cartridge including a magnetic tape for driving engagement with the capstan, a magnetic tape recording and reproducing head mounted on each of said shelves, a vertical camshaft disposed through each of said shelves and being disposed adjacent the inner end of the cartridge, and spring-biased pressure roller assembly including a roller movably mounted on the stationary cartridge for movement toward and away from the driving capstan for effecting a driving connection between the capstan and the magnetic tape, cam means on said camshaft, said pressure roller assembly including cam control means operatively connected to the roller and engaged with the cam means on the camshaft for effecting driving engagement between the pressure roller and the driving capstan at selected intervals.

3. The combination as defined in claim 2 wherein said pressure roller assembly includes a mounting plate pivotally mounted within said cartridge, said roller being journaled on said mounting plate for engagement with the magnetic tape in opposition to the driving capstan, spring means connected with the mounting plate for urging the plate and roller journaled thereon toward the driving capstan, a leg on said plate remote from the pressure roller, and cam follower means on said leg for engagement with the cam means on the camshaft thus forming the means for selectively effecting driving engagement between the capstan and the magnetic tape.

4. The combination of claim 3 wherein said spring means includes an arm carried by said plate with the free end thereof stationarily engaging a portion of the magnetic tape cartridge, said arm being connected to said plate coincident with the pivot axis of said plate, a coil compression spring extending between the arm and the mounting plate for biasing the mounting plate and pressure roller journaled thereon towards the capstan.

References Cited by the Examiner

UNITED STATES PATENTS

| | | | |
|---|---|---|---|
| 2,560,234 | 7/1951 | Masterson. | |
| 2,821,576 | 1/1958 | Gaubert. | |
| 3,083,269 | 3/1963 | Gaubert. | |
| 3,126,162 | 3/1964 | MacKenzie ------ | 226—110 X |

FOREIGN PATENTS

| | | |
|---|---|---|
| 756,547 | 9/1956 | Great Britain. |
| 877,173 | 9/1961 | Great Britain. |

ROBERT B. REEVES, *Primary Examiner.*

ANDRES H. NIELSEN, SAMUEL F. COLEMAN, *Examiners.*